P. G. McCULLA.
Grinding Mill.
No. 29,612.
Patented Aug. 14, 1860.
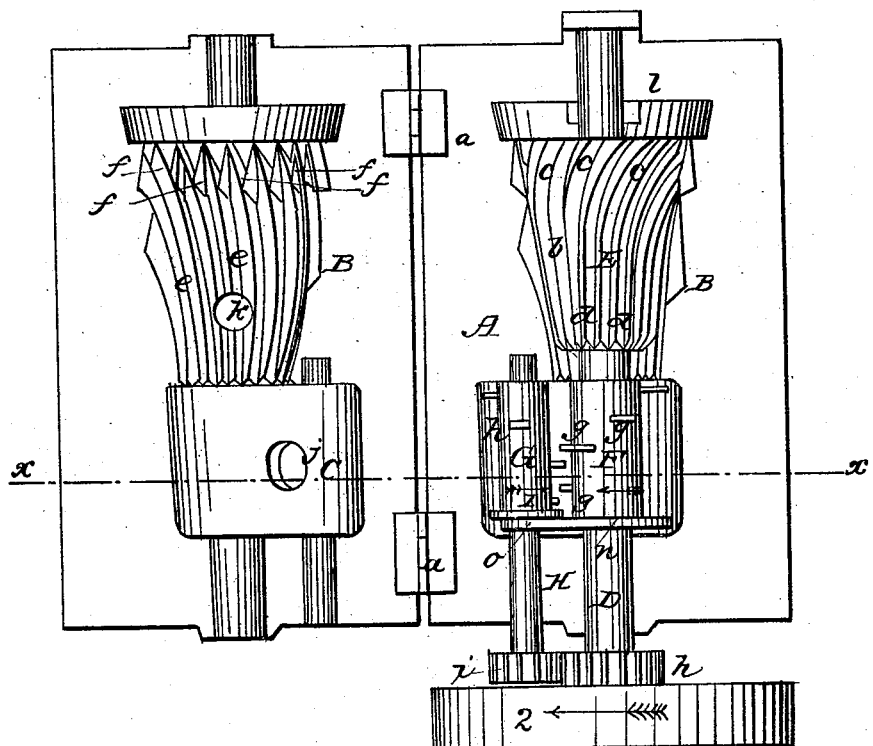
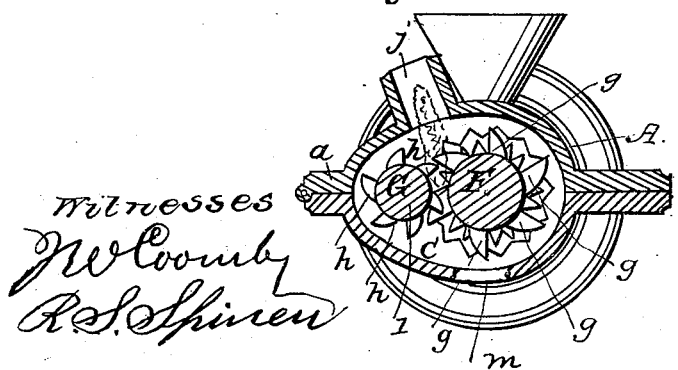

UNITED STATES PATENT OFFICE.

P. G. McCULLA, OF PHILADELPHIA, PENNSYLVANIA.

GRINDING-MILL.

Specification of Letters Patent No. 29,612, dated August 14, 1860.

*To all whom it may concern:*

Be it known that I, P. G. McCulla, of the city and county of Philadelphia and State of Pennsylvania, have invented a new and Improved Grinding-Mill; and I do hereby declare that the following is a full, clear, and exact description of the same, reference being had to the annexed drawings, making a part of this specification, in which—

Figure 1, is a plan or top view of my invention in an open state. Fig. 2, a transverse section of the same in a closed state ready for use.

Similar letters of reference indicate corresponding parts in the two figures.

This invention relates to certain improvements in that class of grinding mills in which a conical rotating grinder is placed within a corresponding shaped stationary shell and which mills have crushing devices attached.

The object of the within described invention is to facilitate the feeding or supplying of the substance to be crushed and ground to the crushing apparatus and also to have the "dress" of the grinder and shell so formed as to insure rapid grinding and a free discharge of the ground substance.

To enable those skilled in the art to fully understand and construct my invention I will proceed to describe it.

A represents a cast metal shell or case which has two chambers B, C, one of which B, is of conical form, and the other C, of egg shape in its transverse section as shown in Fig. 2. The two chambers B, C, adjoin each other as shown clearly in Fig. 1, and the case or shell may be formed of two longitudinal parts secured together by screw bolts. The two parts may be connected at one side by joints or hinges $a$, if desired in order to facilitate the opening of the case when necessary for repairs, cleansing out, or other purposes.

Within the case or shell A, there is placed a longitudinal shaft D, on which there is a conical grinder E, and a cylinder F. The grinder may be of cast-metal provided with spiral or oblique ledges or projections $b$, as shown clearly in Fig. 1. The projections have principally their oblique or spiral form $c$, at the larger or outer end of the grinder, the other part $d$, being nearly or quite in line with the shaft D. The projections $b$, form cutting or grinding surfaces and transversely they may be of the usual form.

The interior of the chamber B, which forms the shell of the grinder has spiral or oblique ledges or projections $e$, which correspond in position to the edges or projections $b$, on the grinder E. The form of the ledges or projections $e$, is shown in Fig. 1. It will be seen that they have not quite so decided a curvature as those of the grinder and also that the curve is gradual from one end to the other, whereas those of the grinder as before stated are nearly or quite straight or in line with the shaft D, toward the smaller end of the grinder and have a "quick" spiral or oblique curvature toward the outer and larger end thereof. The outer ends of the ledges or projections $e$, are scalloped out to form concave terminals $f$, as shown in Fig. 1. The terminals increase the grinding capacity of the discharge end of the chamber E, and insure a free discharge of the ground substance therefrom.

The cylinder F, is provided or armed with teeth $g$, placed on it in a spiral line as shown clearly in Fig. 1.

G, is a cylinder armed with teeth $h$, which are similar to the teeth $g$, of the cylinder F, the teeth of one cylinder being in line with the centers of the spaces between the other.

One end of the shaft D, has a pinion $h$, on it; which gears into a corresponding pinion $i$, on the shaft H, of the cylinder G, and consequently when the mill is in operation the two cylinders will rotate in the direction indicated by the arrows 1, in Fig. 2, the shaft D, rotating in the direction indicated by arrow 2.

The upper part of the case or shell A, has two feed perforations $j$, $k$, in it, $j$, being the feed orifice of the part C, of the shell, and $k$, the feed orifice of the part B, the latter orifice being used when the crushing device is not required. The chamber B, has a discharge orifice $l$, and the chamber C, a discharge orifice $m$.

On the shaft D, there is a circular disk $n$, which works in a grooved disk $o$, on the shaft H, as shown clearly in Fig. 1.

The operation is as follows: The shaft D, is rotated by any convenient power, and if corn and cob or other substance requires to be crushed before grinding it is fed into the part C, of the shell and between the cylinders F, G, which draw in the substance owing to the direction in which they turn. The crushing device may be fed without difficulty and it is not liable to choke or clog as is the case with the usual crushing device which is formed of a single toothed cylinder and a stationary toothed concave. This latter device is quite liable to clog and troublesome to feed, difficulties which are avoided by my invention. The substance is ground between the grinder E, and part B, of the shell and is acted upon in a direct manner by the straight portions of the ledges or projections b, e, and is then acted upon by what may be termed an oblique cut. This obliquity of the ledges or projections b, e, insures the substance being ground evenly or of a uniform degree of fineness, preventing the too free escape of the substance from the mill and thereby causing it to be subjected a suitable time to a proper grinding action. The substance when properly ground is allowed to escape freely from the mill in consequence of the scalloped terminals f, the same increasing the grinding capacity of the discharge end of the mill. The disk n, fitting in the groove o, admits of the cylinder G, moving with the cylinder F, when the grinder E, is adjusted longitudinally so as to grind finer or coarser, the proper relative position of the two cylinders F, G, is therefore always preserved. In case a substance is required to be crushed only, the discharge orifice m, is opened and the crushed substance passes directly out from shell C. When a substance is to be crushed and ground the orifice m, is closed and the crushed substance passes directly into the shell B, and is ground between the grinder and shell, the ground substance being discharged through the orifice l. If a substance is to be ground without crushing, it is fed through the orifice l, directly through the feed opening k.

I do not claim separately the spiral dress, that is to say, the curved ledges or projection b, e, on the grinder and shell, for that has been previously used.

What I claim as my invention, and desire to secure by Letters Patent is—

The arrangement for operation together, of the conical chamber B, egg shaped chamber C, conical grinder E, having scalloped or concave terminals f, and cylinders F, G, armed with cutters g, h, in the manner and for the purposes herein described.

P. G. McCULLA.

Witnesses:
SAMUEL F. FLOOD,
F. NEWELL.